United States Patent [19]
Chambers

[11] Patent Number: 6,055,043
[45] Date of Patent: *Apr. 25, 2000

[54] METHOD AND APPARATUS FOR USING PHASE MODULATION TO REDUCE COHERENCE/POLARIZATION NOISE IN REFLECTOMETERS

[75] Inventor: Frank A. Chambers, Frankfort, N.Y.

[73] Assignee: GN Nettest New York, Inc., Utica, N.Y.

[ * ] Notice: This patent is subject to a terminal disclaimer.

[21] Appl. No.: 08/869,340

[22] Filed: Jun. 5, 1997

[51] Int. Cl.[7] .................................................. G01N 21/00
[52] U.S. Cl. ............................................................ 356/73.1
[58] Field of Search ............................................. 356/73.1

[56] References Cited

U.S. PATENT DOCUMENTS

| | | | |
|---|---|---|---|
| 4,794,249 | 12/1988 | Beckmann et al. | 356/73.1 |
| 4,928,232 | 5/1990 | Gentile | 356/73.1 |
| 5,179,420 | 1/1993 | So et al. | 356/73.1 |
| 5,202,745 | 4/1993 | Sorin et al. | 356/73.1 |
| 5,365,335 | 11/1994 | Sorin | 356/73.1 |
| 5,430,569 | 7/1995 | Blauvelt et al. | |
| 5,432,637 | 7/1995 | Hakimi | 385/11 X |
| 5,479,251 | 12/1995 | Hanson | 356/73.1 |

OTHER PUBLICATIONS

"Fading Noise Reduction in Coherent OTDR", Izumita et al., IEEE Photonics Technology Letters, vol. 4, No. 2, Feb. 1992, pp. 201–203.

"Characteristics and Reduction of Coherent Fading . . . For Optical Fibers and Components", Shimizu et al., Journal of Lightwave Technology, vol. 10, No. 7, Jul. 1992, pp. 982–987.

"Reduction of Polarization Sensitivity of Optical–Time Domain Reflectometers for Single Mode Fibers", Brinkmeyer et al., Journal of Lightwave Technology, vol. LT–4, No. 5, May 1986, pp. 513–515.

"Interferometric Noise Reduction In Fiberoptic Links . . . ", Pepeljugoski et al., Journal of Lightwave Technology, vol. 10, No. 7, Jul. 1992, pp. 957–963.

"A method of Reducing Multipath Interference Noise", IEEE Photonics Technology Letters, vol. 6, No. 3, Mar. 1994, pp. 450–452.

"A Reduction of Interferometric Noise . . . ", Yariv et al., Journal of Lightwave Technology, vol. 10, No. 7, Jul. 1992, pp. 978–981.

"High Dynamic Range, Low Fading Noise OTDR . . . ", Furukawa et al., 17th ECOC, 1991, part 1, pp. 81–84.

*Primary Examiner*—Robert H. Kim
*Attorney, Agent, or Firm*—Wall Marjama Bilinski & Burr

[57] ABSTRACT

Apparatus (OTDR) for accurately locating and measuring the optical parameters and characteristics of fiberoptic cables which reduces the adverse effects of coherence noise without effecting the stability and repeatability of the acquired locating and measuring information.

31 Claims, 5 Drawing Sheets

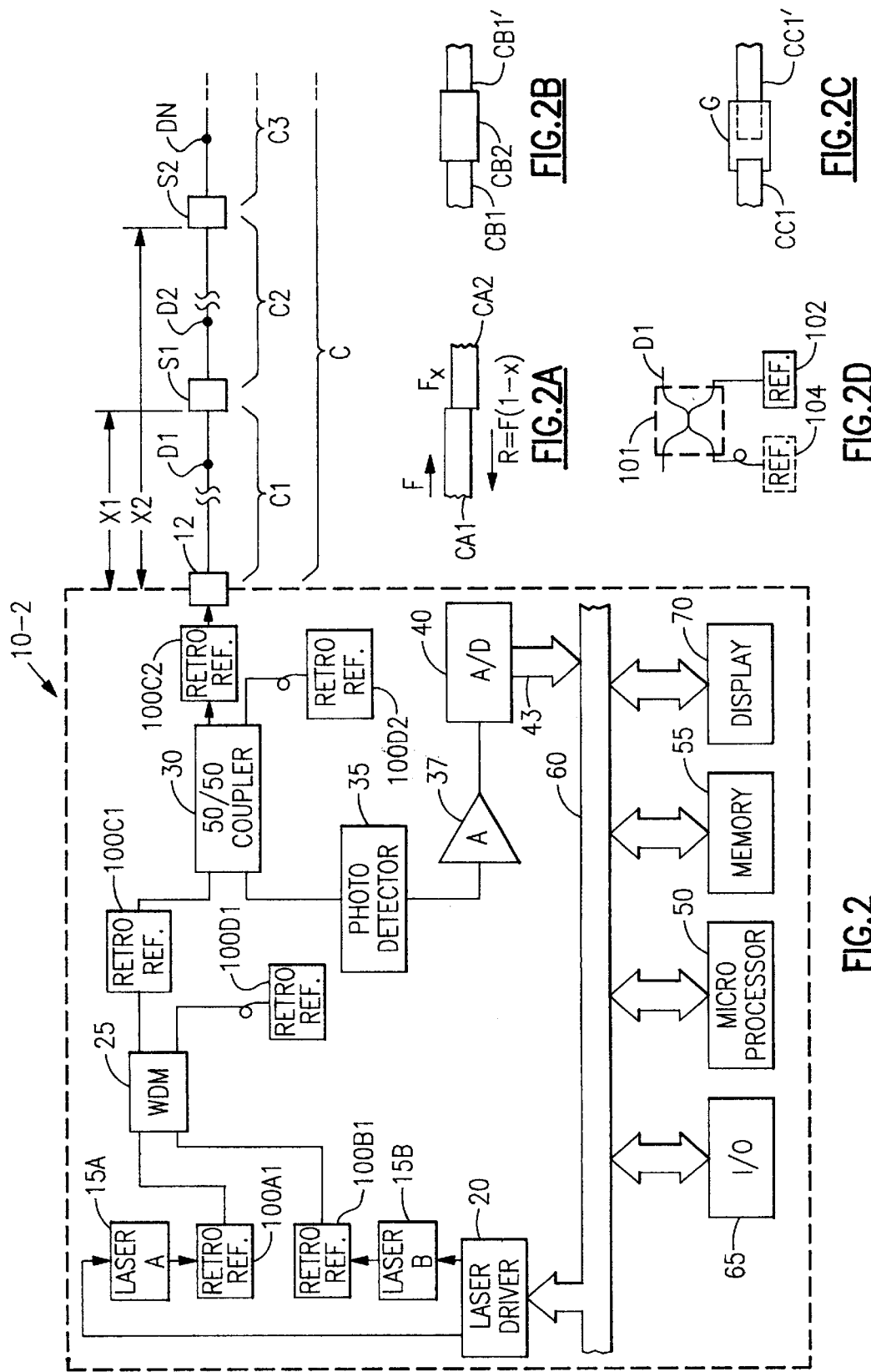

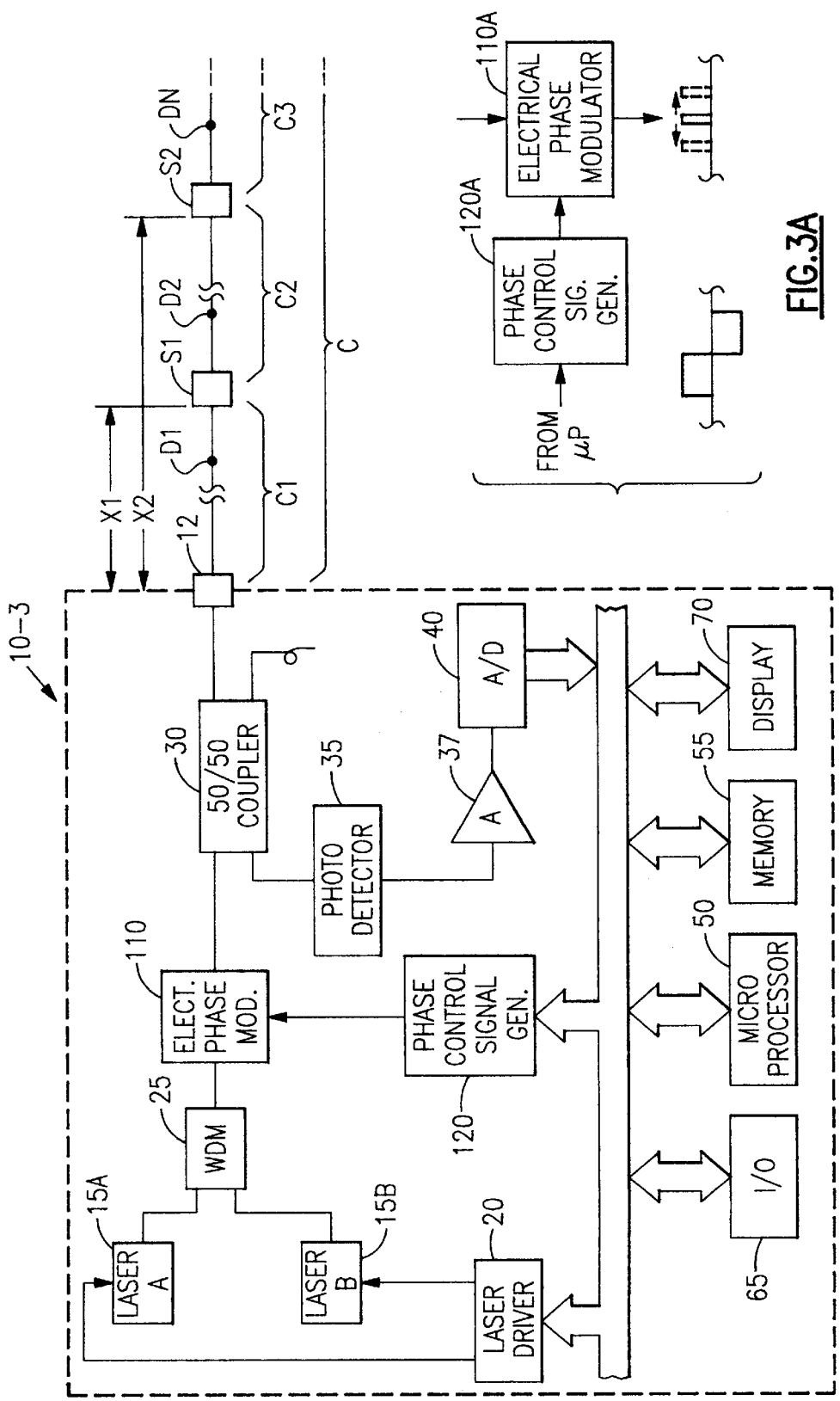

METHOD AND APPARATUS FOR USING PHASE MODULATION TO REDUCE COHERENCE/POLARIZATION NOISE IN REFLECTOMETERS

FIELD OF THE INVENTION

The present invention relates to Optical Time Domain Reflectometers, and is directed more particularly to an improved method and apparatus for reducing coherence/polarization noise in such reflectometers.

BACKGROUND OF THE INVENTION

With the increasingly widespread use of fiberoptic cables as wideband data links, it has become increasingly important to have instruments which are able to accurately locate and measure the optical characteristics and parameters of such cables. Among these characteristics and parameters are characteristics such as attenuation, cutoff, and polarization, and parameters such as the length of the fiber, the location of the end of the fiber, and the numbers, magnitudes and locations of lossy features such as couplings, splices, and defects, among others. Instruments which are designed to perform such measurements are referred to as Optical Time Domain Reflectometers or, more commonly, OTDRs. An example of one type of OTDR is described in U.S. Pat. No. 4,794,249 (Beckmann et al). Examples of commercially available ones of such OTDRs are sold under the model designations TD-1000 and TD-3486 OTDRs by the Laser Precision Division of GN Nettest of Utica, N.Y.

The precision and accuracy of OTDR measurements can be affected by various noise sources. Some of these are purely electronic in nature and others are directly related to the production, transmission, reflection and detection of the optical signal. Among the most important types of noise that affect transmission through fiberoptic cables are background or "white" noise and coherence/polarization noise. Background noise is essentially random in character. This type of noise exists in all systems that include electronic circuitry and affects all pulses, without regard to the temporal duration or spectral width thereof. Because optical signals transmitted along fiberoptic cables decrease in amplitude with distance, they tend to become difficult to distinguish from this noise. OTDRs cope with this type of noise by basing final results on the average of the results of many individual measurements. This is because averaging is a process that tends to cancel out the randomly varying components of a signal such as background noise.

Coherence/polarization noise, on the other hand, is not random in character. It is caused by microscopic features in the optic fiber, such as impurities and variations in dopant concentration. Since such features are localized at fixed points along the fiber, they tend to have repeatable effects. The magnitude of this noise is not particularly troublesome for relatively long duration pulses, such as those with a temporal width significantly greater than the coherence time of the source. This is because such noise tends to become "washed out" over the course of a pulse. For relatively short duration pulses, such as those with a temporal width less than the coherence time, on the other hand, the effect is unable to "wash out" over the course of a pulse. Moreover, because the effect is coherent rather than random, it is less subject to being removed by averaging. Prior to the present invention, attempts to reduce the magnitude of coherence/polarization effects have made use of one of two approaches. One of these involves the use of hardware and software implemented filtering applied on a post sampling basis, i.e., on filters applied to signals after they have been both transmitted and received. A second of these approaches involves using lasers with larger than usual cavities, although this approach is effective in some but not all cases.

For the sake of brevity, the phrase "coherence/polarization noise" will hereinafter be abbreviated to "coherence noise".

Attempts to deal with coherence noise by means of the post processing of the received signal have not been entirely successful. This is because the filtering process used in this post processing often has the effect of filtering out weak but significant events. As a result, the filtering process can prevent the detection of the very features that the measurement is performed to detect and, what is worse, prevent such detection on an intermittent and unpredictable basis. It has recently become evident that the degree of this unpredictability can vary from laser to laser within or between manufacturing batches thereof, as well as from fiber to fiber.

In view of the foregoing it will be seen that, prior to the present invention, there has existed a need for a method and apparatus for reducing the effect of coherence noise in OTDRs, and for doing so in a manner that does not effect the stability and repeatability of measurements made with ODTRs.

SUMMARY OF THE INVENTION

In accordance with a first aspect of the present invention, it has been discovered that recently occurring increased difficulties with the coherence effect is caused, paradoxically, by recent improvements in the line widths and the stability of laser diodes. More particularly, it has been discovered that recently occurring increased difficulties with coherence noise are the result of improved quality and design of laser diodes, and in the resultant generation of optical pulses having fewer modes, increased uniformity, narrower spectral widths, and greater spectral stability. The paradoxical nature of these improvements is that, at least for relatively short optical pulses, these improvements increase the coherence component of the total noise to the point where it can no longer be effectively dealt with by the usual averaging and post sampling techniques.

In accordance with a second aspect of the present invention, it has been discovered that recently occurring difficulties with the coherence effect may be substantially reduced by controllably decreasing the spectral stability of the laser output pulses and/or by controllably modifying the phase relationships between the OTDR output pulses and the output pulses of the lasers. As will be explained more fully presently, this may be accomplished in a variety of different ways using control variables that may be any one (or more) of electrical, optical, electrooptical, thermal and thermoelectrical in nature.

In a first embodiment of the method of the invention, the spectral stability of the pulses transmitted by OTDRs is decreased by driving the lasers with a drive signal having a waveform that prevents the laser from rapidly settling into a stable operating state, characterized by a relatively small number of modes and relatively narrow spectral width. In other words, the operation of the laser is controllably destabilized so that optical components having randomly varying frequencies (or phase positions) are introduced into the output of the laser. Because of this destabilization or randomization, the coherence noise that is associated with laser output pulses that are "too good" becomes subject to elimination by conventional techniques such as averaging. As a result, there is less apparent noise in the measured output signal and, consequently, no need to apply the post sampling techniques (such as filtering) which have prior to the present invention, resulted in lost data. Thus, the first embodiment of the method of the invention, and the various apparatuses that enable that method to be put into practice, solves the coherence problems that have recently caused difficulties with the use of OTDRs.

In a second embodiment of the method of the invention, the spectral stability of the pulses transmitted by OTDRs is decreased by the step of redirecting or retroreflecting a portion of the laser output pulse back into the laser. This retroreflection so interferes with the lasing process on the optical level that the laser is again prevented from rapidly settling into an operating state characterized by a relatively small number of modes and a relatively narrow spectral width. For the reasons discussed earlier, this embodiment of the method of the invention also has the effect of introducing components having randomly varying frequencies or phase positions into the output of the laser. Thus, the second embodiment of the method of the invention, and the various apparatuses that enable that method to be put into practice, also solve the coherence problems that have recently caused difficulties with the use of OTDRs.

In a third embodiment of the method of the invention, the spectral content of pulses transmitted by OTDRs is increased by so modulating the phase of the laser output pulses, during or after their generation, that the optical pulses transmitted by an OTDR have a phase position that varies randomly as a function of time. The phase position of the laser output pulses may, for example, be modulated by commercially available optical phase modulators. Thus, for reasons similar to those discussed earlier herein, the third embodiment of the invention, and the various apparatuses that enable that method to be put into practice, also solve the coherence problems that have recently caused difficulties with the use of ODTRs.

In a fourth embodiment of the invention, the desired reduction in coherence noise is produced by thermal means. This may, for example, be accomplished by controllably changing the temperature of the laser and thereby decreasing the spectral stability thereof. This method of destabilizing the laser is broadly similar to the above described electrical destabilization, except that it operates on a very much longer time scale. Alternatively, this may be accomplished by controllably changing or modulating the phase relationship between the output pulses of the laser and the OTDR. This may, for example, be accomplished by controllably changing or modulating the temperature of a spool of fiber and thereby modulating the phase position of the OTDR output pulse by means of the thermal expansion effect. This method or reducing coherence noise is broadly similar to the above described third embodiment, except that it again operates on a very much longer time scale.

In view of the foregoing, it will be seen that, in its most general aspect, the method and apparatus of the present invention contemplates the use of a variety of different methods for controllably decreasing the spectral stability of optical pulses transmitted by OTDRs or modifying the spectral content or distribution. As will be apparent to those skilled in the art of OTDRs, all of these different methods have in common what will be referred to herein as the step of controllably destabilizing, randomizing or modifying the optical content of the laser which generates the desired OTDR output pulse, randomizing the pulse generated by the laser, or modifying the spectral content of a pulse generated by a laser that is operating normally. It will be understood that all such embodiments are within the contemplation of the present invention.

DESCRIPTION OF THE DRAWINGS

Other objects and advantages of the invention will be apparent from the following description and drawings, in which:

FIG. 2 is a block diagram of a second, induced reflection embodiment of an apparatus suitable for use in practicing the method of the invention;

FIGS. 2A–2D are block diagrams of various exemplary devices that are suitable for use with the embodiment of FIG. 2;

FIG. 3 is a block diagram of a third, phase modulating embodiment of an apparatus suitable for use in practicing the method of the invention;

FIGS. 3A is a fragmentary block diagram of the embodiment of FIG. 3 that shows exemplary waveforms for signals associated therewith;

FIGS. 4A–4C 4A-1, 4A-2 are fragmentary block diagrams of exemplary devices that are suitable for use with the embodiment of FIG. 4.

DESCRIPTION OF THE PREFERRED EMBODIMENTS

Figures 1, 5:
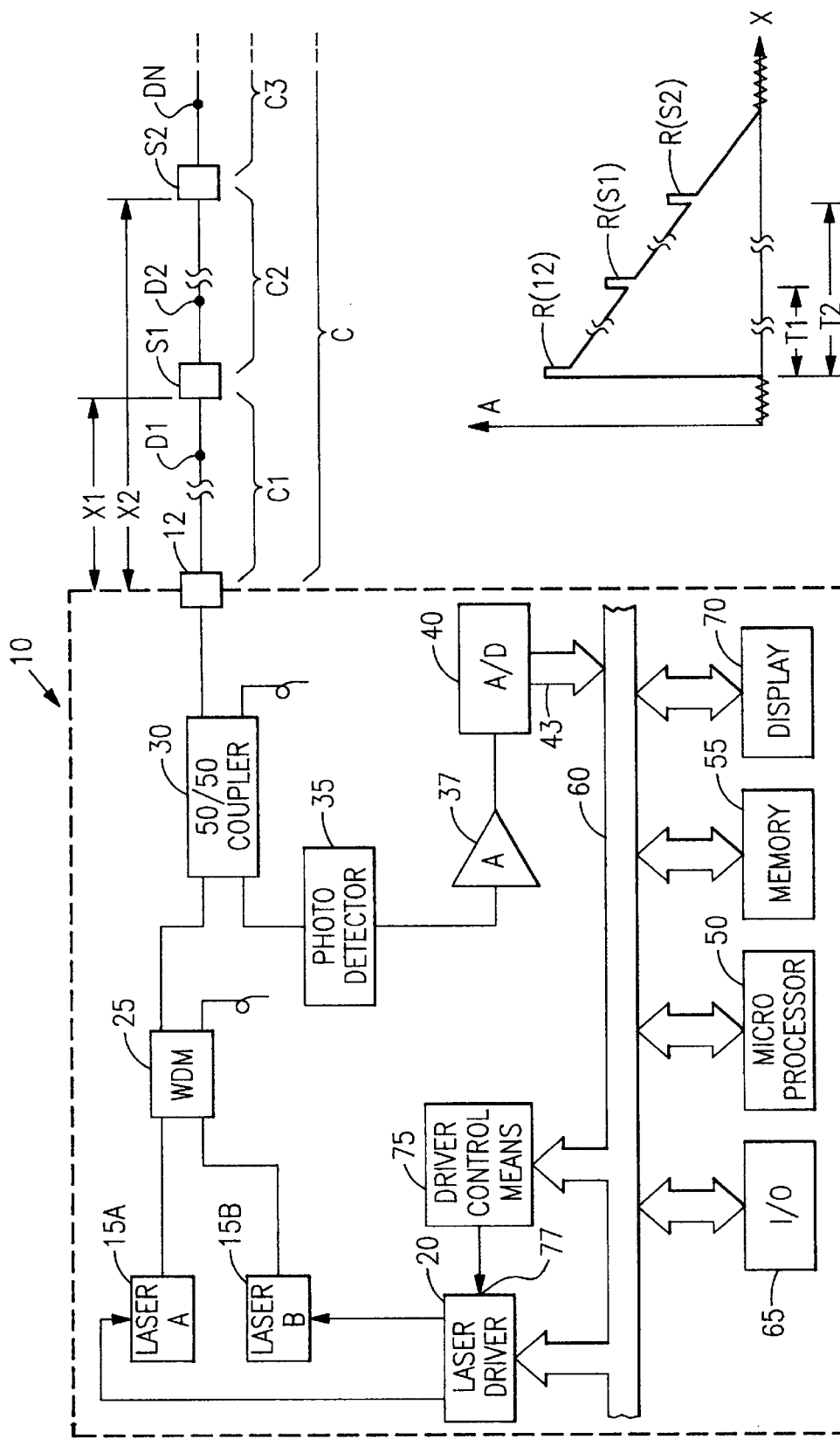
FIG. 1 is a block diagram of a first, laser modulating embodiment of an apparatus suitable for use in practicing the method of the invention.
FIG. 5 is a simplified representation of information of the type that may be displayed by the apparatuses shown in FIGS. 1–4.

Referring to FIG. 1, there is shown a block diagram of an OTDR 10 that is suitable for use in practicing a first, laser modulating embodiment of the method of the invention. Also shown in FIG. 1 is a fiberoptic cable C that may extend for hundreds of kilometers from the output coupling 12 of OTDR 10 to a receiver or other utilization device, not shown. Cable C will typically be made up of a plurality of component fiberoptic segments C1, C2 . . . CN which are joined together by optical connectors or splices S1, S2 . . . SN that are located at distance X1, X2 . . . XN, respectively, from output coupling 12. Fiberoptic features, such as breaks, chips, etc., that give rise to changes in backscatter or reflected light that can be detected by OTDR 10 are shown by black dots labelled D1, D2 . . . DN. As used herein, the term "event" will be understood to apply generically to changes inwardly propagating light caused by normal features, such as couplings or splices, and caused by abnormal features such as fiber defects.

Generally speaking, OTDR 10 includes one or more solid-state lasers, such as 15A and 15B, which operate at different respective nominal wavelengths preferably, but not necessarily, equal to 1310 and 1550 nm, respectively, when driven by respective outputs of a suitable laser driver circuit 20. The output of the driven one of lasers 15A and 15B is applied to cable C, via coupler 12, through a suitable wavelength division multiplexer (WDM) 25 and a coupler or splitter 30 which preferably, but not necessarily, has a 50/50 coupling ratio. In the embodiment of FIG. 1, WDM 25 functions as an optical OR device between lasers 15A and 15B and coupler 30. Coupler 30, on the other hand, serves as a bidirectional optical splitter, directing 50% of laser pulses received from WDM 25 to Cable C, and directing 50% of the light reflected back from features of cable C to a conventional photodetector device 35, such as an avalanche photodiode or PIN diode.

OTDR 10 of FIG. 1 also includes an amplifier 37, which is connected to a suitable A/D converter 40. If desired, a separate amplifier may be provided for use with each laser. As a result of these connections, A/D converter 40 will output, at output 43 thereof, a series of digital signals, each of which is a returned power level at a respective time period. These time periods may be regularly spaced and have a suitable sampling rate, such as 10–12 MHz. Each of these signals will have a multi-bit value indicative of the magnitude of the returned power level for the feature which gave rise thereto.

The first reflective event of a transmission will be the reflection, from OTDR coupling 12, of a tiny fraction of the light from an outgoing optical pulse. This allows the first reflective event to be used as a time reference pulse, shown as pulse R(12) in FIG. 5. The occurrence times of later occurring events, such as R(S1), R(S2), may then be measured with respect to event R(12), as shown by times T1 and T2 of FIG. 5. Since the speed of light in cable C is constant, times T1, T2, etc. may be used to determine the distances, from coupling 12, of the features that gave rise to these events, as shown by distances X1, X2, etc. of FIG. 1.

The overall operation of the above described OTDR components are preferably controlled by a suitable programmable control circuit, such as microprocessor 50 of FIG. 1, which operates in conjunction with a memory 55 that incudes both a program memory space and data memory space. Processor 50 and memory 55 are coupled to one another, and to laser driver 20 and AND converter 40, among others, via a suitable multiconductor bus 60. Also coupled to bus 60 are an I/O interface device through which a user may enter data or commands into OTDR 10, and a display 70 through which data, such as that shown in FIG. 4, may be presented to a user.

Because the structure and operation of the above-described portions of OTDR 10 are well known to those skilled in the art, they will not be described further herein. The portion of OTDR 10 which will now be described are those which modify the structure and operation of OTDR 10 in a manner which makes possible the practice of a first embodiment of the method and apparatus of the present invention.

As explained previously, the present invention contemplates the reduction of coherence noise by preventing the ODTR from applying to cable C optical signals which have a spectral content such that these signals give rise to excessive coherence noise, particularly for optical pulses that have widths that are relatively short compared to their coherence length. As also explained previously, the present invention accomplishes this by any one or more of controllably destabilizing, randomizing or reorganizing the spectral content of the laser which generates the desired OTDR output pulse, randomizing the pulse generated by the laser, or modifying the spectral content of a pulse generated by a laser that is operating normally.

Laser Modulating Embodiments of the Invention

In the embodiment of FIG. 1, the desired spectral destabilization is accomplished by destabilizing or randomizing the operation of lasers 15A and 15B by electrically powered means. This is preferably accomplished by including in OTDR 10 a driver control circuit 75 which is connected to provide laser driver circuit 20 with a modulating signal that causes the latter to drive the driven laser in a manner that prevents it from settling down into a stable steady state operating mode during the generation of a pulse. This modulating signal may, for example, be applied to laser driver 20 via a modulating input 77 which is specially provided for this purpose. It will be understood that it is unimportant for purposes of the invention whether this modulation is introduced by varying the supply voltage of the driver, the gain of the drive transistor, etc., so long as the effect of the modulating signal is to change the excitation of the laser as a function of time.

Figure 1A:
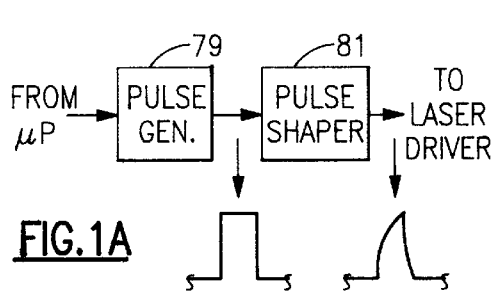
FIGS. 1A and 1B are block diagrams of various exemplary devices that are suitable for use with the embodiment of FIG. 1.
Figure 1B:
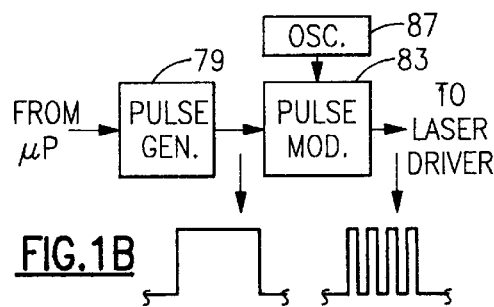

Examples of circuits that may be used as driver control circuit 75 are shown in FIGS. 1A and 1B. Turning first to the embodiment of FIG. 1A, the driver control circuit may take the form of a pulse generating circuit 79, such as a one-shot multivibrator, that drives modulating input 77 via a pulse shaping circuit 81. Examples of one set of shaped pulses that may be used for this purpose are shown adjacent to circuits 79 and 81, although the actual shapes of these are unimportant so long as they controllably destabilize the operation of the driven laser.

A second embodiment of a driver control circuit is shown in FIG. 1B. In the latter embodiment, the driver control circuit again includes a suitable pulse generating circuit 79. Instead of a pulse shaping circuit of the type shown in FIG. 1A, however, it includes a pulse shaping circuit that comprises an AM pulse modulator 83, such as an AND gate one input of which is connected to a carrier signal generating oscillator 87. It therefore, produces the amplitude modulated drive waveform shown adjacent to modulator 83. An otherwise suitable frequency modulated (FM) modulator or a duty cycle modulator (e.g. a pulse width modulator) could also be used. Again, the important feature is the step of controllably destabilizing or chaoticizing the operation of the driven laser and not the particulars of the apparatus used to perform that step.

In practicing the embodiment of FIG. 1B, the pulse generating circuit and pulse modulating circuit may be replaced by a programmable pulse generating circuit which is adapted to generate a drive signal having a predetermined shape each time that it receives a command, (e.g. a pulse) from processor 50. Equivalently, processor may itself generate a signal of the desired shape, with the programmable pulse generating circuit being replaced by a simple drive or buffer amplifier. Once again it is the desired controllable laser destabilization and not the particulars of the circuitry which is important.

Retroreflective Embodiments of the Invention

Figure 4A:
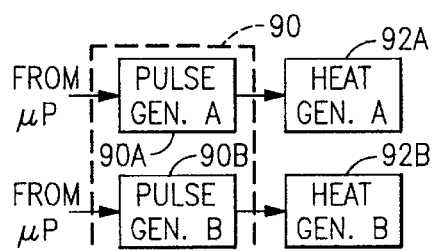
Figure 4B:
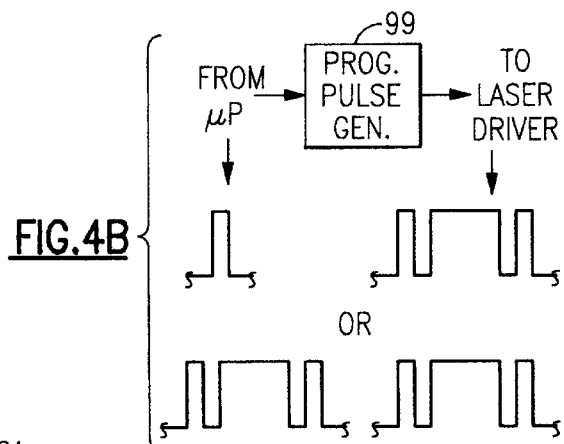
Figures 1, 4A:
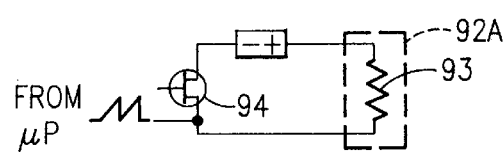
Figures 2, 4A:
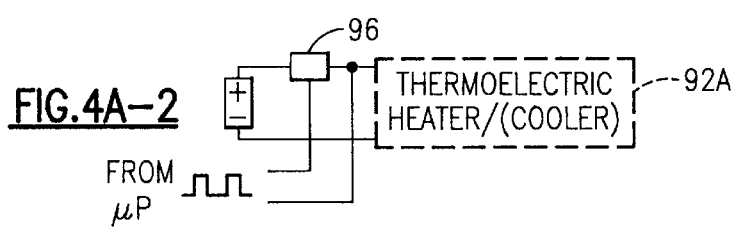

Referring to FIG. 2, there is shown an OTDR 10-2 which is similar to OTDR 10 of FIG. 1, like functioning parts being similarly numbered, except that it uses a different method for changing the spectral content of the pulses output by the OTDR. In the embodiment of FIG. 2 the desired change in spectral content is produced by optically (rather than electrically) altering the operating condition of the lasers. More particularly, in the embodiment of FIG. 2, the method of altering the operating condition of the laser comprises the step of directing part of the light output by the laser back into the laser and thereby controllably changing the spectral content of the optical pulse output by the OTDR. For the sake of brevity this step will be referred to herein as the step of retroreflecting light produced by the laser.

The retroreflective embodiment of the invention may be realized by means of any of a plurality of different retroreflective structures. Any of these different structures may, in turn, be located at any of a plurality of different locations between the lasers and output coupling 12. In order to avoid the needless showing of all permutations and combinations of these retroreflective structures and locations, OTDR 10-2 of FIG. 2 has been shown with a reflective structure in each of a plurality of the different locations at which such a structure may be usefully positioned. In addition, FIGS. 2A–2D show exemplary ones of a plurality of different kinds of retroreflective structures. It will therefore be understood that, in spite of the fact that numerous retroreflector structures are showing in the OTDR of FIG. 2, only one such retroreflector (or one pair of such reflectors) will ordinarily be included for each of the lasers included therein. It will also be understood that any of the retroreflective structures shown in FIG. 2 may comprise any of the retroreflective structures shown in FIGS. 2A–2C.

Referring to FIG. 2, the various locations at which retroreflective structures may be usefully positioned include the following. First, they may be located in proximity to the outputs of lasers 15A and 15B or, more generally, between the outputs of those lasers and respective inputs of WDM 25, as shown by retroreflectors 100A1 and 100B1 of FIG. 2. In these locations, the retroreflectors direct laser light emitted by the lasers directly back into respective outputs thereof and thereby change the spectral content of the light reaching respective inputs of WDM 25. The advantage of this position is that it allows the spectral content of the outputs of lasers 15A and 15B to be set and adjusted independently.

Second, the retroreflective structures may be located in series with the main outputs of WDM 25 and/or coupler 30, as shown by reflectors 100C1 and 100C2 of FIG. 2. The advantages of these locations is that a single retroreflector may be used to modify the spectral content of light generated by both lasers. Ordinarily, but not necessarily, retroreflectors will be located either in the above described first or in the just described second positions, but not in both.

Third, the retroreflectors may be located at the ends of the secondary outputs of WDM 25 and/or coupler 30, as shown by reflectors 100D1 and 100D2 of FIG. 2. The advantages of these locations is that they produce less overall attenuation of the light transmitted between the lasers and output coupling 12. Ordinarily, but not necessarily, retroreflectors will be located in one of the above-described first and second positions, or in the just described third positions, but not in both.

Referring to FIGS. 2A–2D, there are shown a plurality of different retroreflector structures that are suitable for use with the embodiment of FIG. 2. FIG. 2A shows a retroreflector structure in which a predetermined axial misalignment of fibers CA1 and CA2 is used to cause a fraction, X, of forwardly transmitted light F to be reflected backwardly as reflected light $R=F(1-X)$. FIG. 2B shows a retroreflector structure in which the desired reflection is produced by including, between two similar fibers CB1 and CB1', a different and mismatched fiber segment CB2. FIG. 2C shows a retroreflector structure in which the desired reflection is produced by including, between two similar fibers CC1 and CC1', a suitable Bragg diffraction grating G. FIG. 2D shows a retroreflector structure in which the desired reflection is produced by including, in series with a fiber D1, a coupler, such as a 50/50 coupler 101, the secondary output of which is terminated by a suitable reflector 102. If desired, suitable reflectors may be included at both outputs of coupler 101, as suggested by a reflector 104 shown in dotted lines in FIG. 2D. Other suitable reflective structures and arrangements will be apparent to those skilled in the art.

If desired, any of retroreflector embodiments 2A, 2C and 2D may be made mechanically or electrically adjustable in order to render the desired change in spectral content subject to manual or automatic (i.e., closed loop) control. In the case of the embodiments of FIGS. 2A and 2C, for example, the misalignment of the fibers or the orientation of the grating may be adjusted either mechanically or electrically. In the embodiment of FIG. 2D, the coupling ratio may be adjusted mechanically; alternatively, the degree of reflection provided by reflector 102 may be controlled by means of a liquid crystal or other controllably variable element of electrically controllable reflectivity.

Phase Modulating Embodiment of the Invention

Referring to FIG. 3, there is shown an OTDR 10-3 which is similar to OTDR 10 of FIG. 1, like functioning parts being similarly numbered, except that it uses a still different method for randomizing the pulses output by the OTDR. In the embodiment of FIG. 3 the desired coherence noise reduction is produced by modulating the phase of light passing through the OTDR. More particularly, in the embodiment of FIG. 3, a phase modulating signal is used to electrically vary the phase positions of the output pulses of the OTDR with respect to the output pulses of the lasers, thereby causing these outputs to be less subject to coherence effects. For the sake of clarity this step will be referred to herein as the step of phase modulating the light generated by the laser.

The electrical phase modulating embodiment of the invention may be realized by means of any of a plurality of different phase modulating structures. In the preferred embodiment, these phase modulating structures contemplate the introduction, in series with the main optical path through the OTDR, of a controllable phase modulating element, and the inclusion of a user or program controllable phase control signal generator for generating an electrical signal for controlling the modulating element in the desired manner. Together these elements perform the step of controllably varying the phase positions of the output pulses of the OTDR and thereby preventing those pulses from giving rise to coherence noise.

In the embodiment of FIG. 3, the phase modulating structure includes an optical phase modulator 110 which is connected in series between WDM 25 and coupler 30, and a phase control signal generator 120 which is connected between bus 60 and modulator 110. As in the case of the retroreflective structures of the embodiment of FIG. 2, the phase modulating structure of the embodiment of FIG. 3 may be located at other suitable points between the lasers and the output of the OTDR. Because these other locations will be apparent to those skilled in the art, they will not be shown or described in detail herein.

Referring to FIG. 3A, there is shown a phase modulating embodiment of the invention in which the phase modulator is an electrically operated phase modulator 110A that is modulated by an electrical signal generated by an electrical phase control signal generator 120A. Phase modulator 110A may comprise a phase modulator of any of a plurality of commercially available types such as, for example, those manufactured by UTP Corporation. Phase control signal generator 120A may comprise of any of a plurality of different pulse generating and shaping circuits, such as those described in connection with the embodiment of FIG. 1. Alternatively, phase signal generator 120A may be eliminated as a discrete circuit, with its function being served directly by microprocessor 50, via bus 60 and suitable amplifying or buffer circuits. It will be understood that all such variants are equivalents for purposes of the present invention.

In operation, the electrical phase modulator introduces, into the optical path between the laser and the OTDR output, a medium having phase retardant properties which vary as a function of electric field intensity. Accordingly, when this electric field is made to vary as a function of time, the phase retardant effect of this modulator will also vary as a function of time. In accordance with the present invention, the parameters of phase modulator and signal generator are selected so that the magnitude of this effect is large enough to change the spectral content of the OTDR output pulse sufficiently to substantially decrease the level of coherence noise in the system.

Thermally Modulated Embodiments of the Invention

Figure 4C:
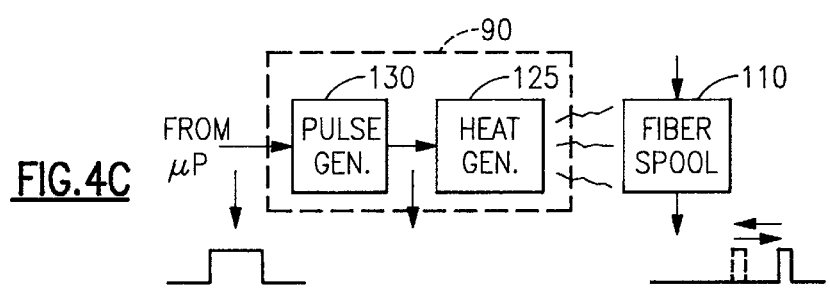
Figure 4:
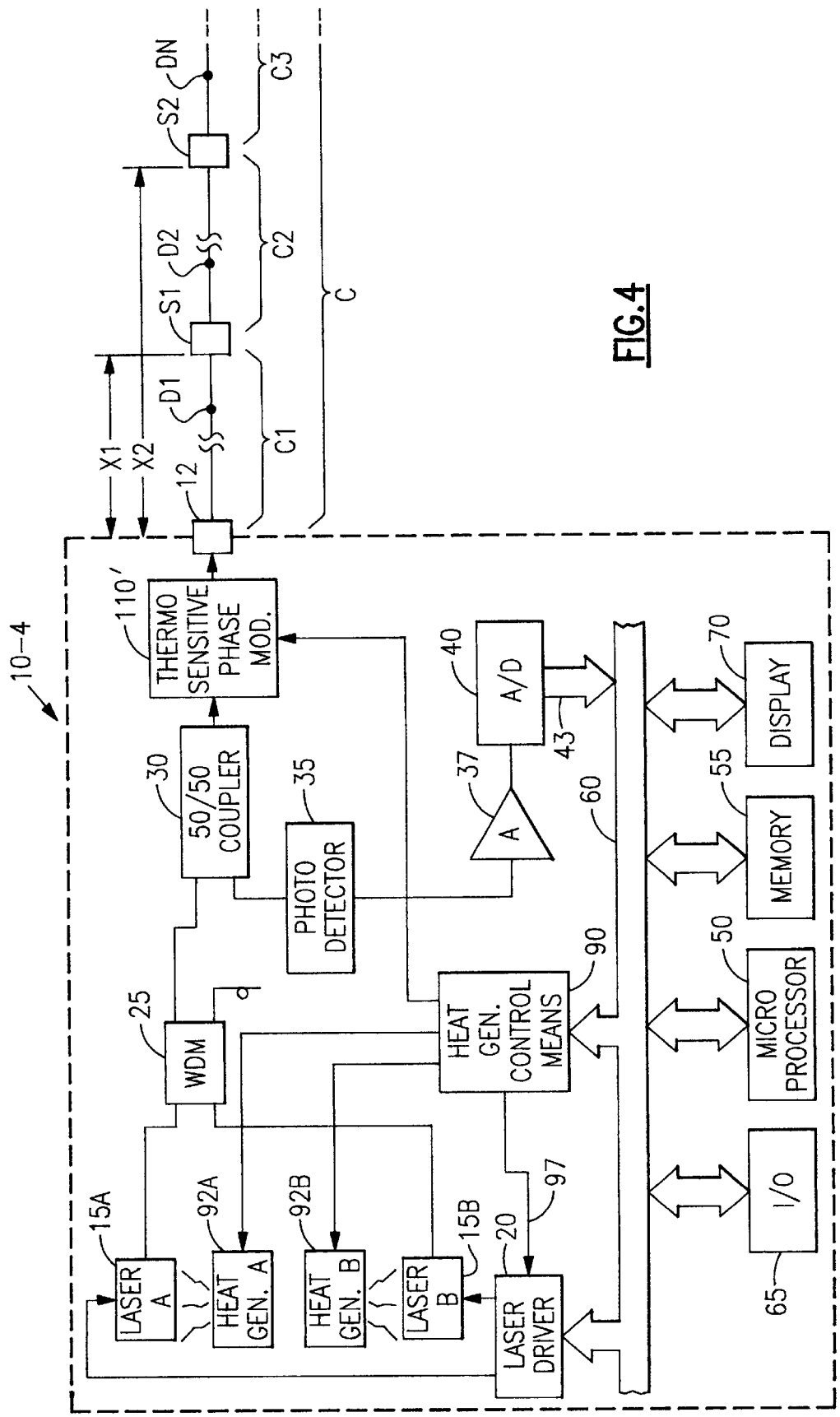
FIG. 4 is a block diagram of a fourth, thermally operated embodiment of an apparatus suitable for use in practicing the method of the invention.

Referring to FIG. 4, there is shown an OTDR 10-4 which is similar to OTDR 10 of FIG. 1, like functioning parts being similarly numbered, except that it uses yet another different method for randomizing or changing the spectral content of the light output by the OTDR. More particularly, in the embodiment of FIG. 4, a phase modulating signal is used to thermally or electrothermally destabilize the operation of the driven laser and/or to randomize the phase positions of the output of the OTDR. For the sake of clarity, these steps will be referred to herein generically as the step of thermally modulated the light generated by the OTDR.

In the preferred embodiment, the laser destabilizing variants of the thermally modulated embodiment of the invention, may take one or both of two forms. A first of these variants is based on the addition to OTDR 10 of a heat generating control circuit 90 and a pair of heat generating devices 92A and 92B as shown in FIG. 4. The latter are preferably located in thermal proximity to lasers 15A and 15B, respectively. This embodiment differs from the electrically modulated embodiments and 1B, firstly, in that the randomizing signal is a thermal randomizing signal, and secondly, that the randomizing signal is used to change the temperatures of the lasers rather than their excitation.

Examples of embodiments of circuits that may be used in practicing thermally induced destabilization of the lasers are shown in FIGS. 4A and 4B. In FIG. 4A, heat generating control circuit 90 comprises a pair of pulse generating circuits 90A and 90B that are able to controllably generate an output pulse having sufficient power to drive heat generating devices 92A and 92B, respectively, thereby vary the temperatures of lasers 15A and 15B, respectively. Since the frequency of the light emitted by a laser is a function of temperature in response to heat applied thereto, the effect of this method of destabilizing the lasers is generally similar to that shown in FIG. 1A, except that the time scale is more aptly expressed in seconds than microseconds. As will be apparent to those skilled in the art, the pulses generated by pulse generators 90A and 90B may have any of a variety of different shapes, including but not limited to those shown in FIGS. 1A and 1B.

Included with FIG. 4A are two specific examples of thermally based circuits that may be used in practicing the invention. A first of these, shown in FIG. 4A-1, includes a resistive heating element 93 which is driven by a variable conducting device 94, such as an FET. A second of these, shown in FIG. 4A-2, includes a thermoelectric heating and/or cooling device 96 which is driven by either a variable conducting or an on-off switching element 96. Other examples of circuits of this type will be apparent to those skilled in the art.

In addition to the above-described thermally based embodiments of the invention, it is also possible to produce an electrothermal embodiment thereof. More particularly, the present invention may be practiced by an embodiment in which the desired degree of destabilization of the laser is produced by raising the temperature of the lasers by controlling the current that laser driver 20 applies to the lasers. In FIG. 4 this embodiment might take the form of an OTDR that includes a heat generating control circuit 90 that is connected to laser driver circuit 20 via a conductor 97, but that does not include either of heat generators 92A and 92B. With this embodiment, the variation of the degree of self heating of the lasers by the modulation of their drive currents produces the desired change in their spectral content. An example of a heat generating control circuit that may be used for his purpose is shown in FIG. 4B as a programmable pulse generating circuit 99. This circuit may be used to generate a variety of modulated waveforms that are similar to those discussed in connection with FIG. 1B, except that they use a longer time scale. Because the structure and operation of such embodiments will be apparent to those skilled in the art, they will not be described in detail herein.

Referring to FIG. 4, there is shown an embodiment of the invention in which the phase of the output light of the OTDR is randomized by a phase modulator that is controlled by a thermal phase control signal rather than an electrical phase control signal. With this embodiment the desired phase modulation may be produced by a thermosensitive phase modulator 110 which is controlled by a heat generating control circuit 90 that may be of the type shown in FIG. 4C. Phase modulator 110 may comprise a spool of fiberoptic fiber several meters in length which is wound around a thermally conducting core. Heat generating control circuit 90 may include a heat generator circuit 125, such as one of those described earlier in connection with FIGS. 4A-1 and 4A-2, which is positioned within the thermally conducting core of the spool to transmit heat thereto. The amount of heat generated by heat generator 125 may be controlled by a suitable driver control circuit 130, similar to one of the pulse generating and shaping circuits described earlier in connection with FIGS. 1A and 1B, except for their use of a longer time scale. Other driver control circuits will be apparent to those skilled in the art.

In operation, the thermal phase modulator introduces, into the optical path between the laser and the OTDR output, a medium having phase retardant properties which vary as a function of temperature. Accordingly, when the temperature of this medium is made to vary as a function of time, the phase retardant effect of the fiber will also vary as a function of time. In accordance with the present invention, the parameters of the phase modulators and signal generators are selected so the magnitude of this effect is large enough to randomize the ODTR output pulse sufficiently to substantially decrease the level of coherence noise in the system.

SUMMARY

In view of the forgoing, it will be seen that in its positive aspect, the present invention contemplates both a variety of different methods for so changing the spectral content of the output of an OTDR that coherence noise is maintained within acceptable limits, and a variety of different apparatuses for practicing those methods. It will also be seen that, in its negative aspect, the present invention contemplates the elimination of previously used methods (such as post sampling filtering) for reducing the effect of coherence noise, and thereby increasing the signal-to-noise ratio of the OTDR. Accordingly, it will be seen that the method and apparatus of the invention represent significant advances in the field of OTDR measurements.

While the invention has been described with reference to a number of particular specific embodiments, it will be understood that the true spirit and scope of the invention should be determined only with reference to the following claims.

What is claimed is:

1. An optical time domain reflectometer for performing measurements on an optical fiber transmission line comprising, in combination:
   a laser for generating optical pulses for application to said transmission line;
   an optical path through which optical pulses generated by said laser may be applied to said transmission line;
   photodetecting means for measuring the intensity of light reflected from said transmission line as optical pulses propagate along said transmission line;
   phase shifting means for controllably shifting the phase positions of said pulses with respect to one another before said pulses are applied to said transmission line; and
   averaging means for averaging the intensity of the light detected by said photodetecting means during the propagation of a plurality of different optical pulses;
   whereby the coherence noise observed on said transmission line is reduced.

2. The reflectometer of claim 2 in which in which the phase positions of said pulses are shifted over a range of phase positions that is broad enough to reduce the magnitude of coherence effects.

3. The reflectometer of claim 1 in which said phase shifting means is responsive to an electrical signal.

4. The reflectometer of claim 1 in which said phase shifting means is responsive to a thermal signal.

5. The reflectometer of claim 1 in which said phase shifting means is coupled to said optical path.

6. The reflectometer of claim 1 in which said phase shifting means is disposed in optical series with said optical path.

7. A method for reducing the coherence noise observed by an optical time domain reflectometer of the type including a laser for generating optical pulses for application to a transmission line, including the steps of:
   (a) providing a phase modulating device for varying the phase positions of optical pulses propagating therethrough in accordance with the magnitude of a control signal;
   (b) coupling said a modulating device between said laser and said transmission line;
   (c) varying the magnitude of said control signal to controllably shift the phase positions of optical pulses applied to said transmission line;
   (d) measuring the intensity of light reflected from said transmission line as optical pulses propagate along said transmission line; and
   (e) averaging the intensity of the light measured during the propagation of a plurality of different optical pulses.

8. The method of claim 7 in which said varying step is repeated for a succession of said optical pulses, and in which the magnitude of said control signal changes between successive ones of said optical pulses.

9. The method of claim 7 in which said modulating device comprises a phase shifting device for controllably shifting the phase positions of said optical pulses relative to one another over a range of phase positions that is broad enough to reduce the magnitude of coherence effects.

10. The method of claim 7 in which said control signal is an electrical control signal, and in which said varying step comprises the step of varying said electrical control signal as a function of time.

11. The method of claim 7 which said control signal is a thermal control signal, and in which said varying step comprises the step of varying said thermal control signal as a function of time.

12. An optical time domain reflectometer for performing measurements on an optical transmission line comprising, in combination;
   a laser for generating a succession of laser pulses;
   an optical fiber path disposed between said laser and said transmission line;
   phase shifting means coupled to said optical fiber path for varying the phase positions of said laser pulses;
   a photodetector for measuring the intensity of light reflected back to said reflectometer as said succession of pulses propagates along said transmission line and;
   averaging means for averaging the intensities of light reflected reflected back to said photodetector during the propagation of optical pulses having differing phase positions;
   whereby the coherence noise observed by said reflectometer is reduced.

13. A reflectometer as set forth in claim 12 in which said phase shifting means comprises a phase modulator for controllably varying the phase positions of said laser pulses as a function of time.

14. A reflectometer as set forth in claim 13 in which said phase modulator is responsive to an electrical phase control signal.

15. A reflectometer as set forth in claim 14 in which the magnitude of said electrical phase control signal changes between successive ones of said laser pulses.

16. A reflectometer as set forth in claim 12 in which said varying phase positions occupy a range of phase positions that is wide enough to reduce said observed coherence noise.

17. An optical time domain reflectometer for performing measurements on an optical transmission line comprising, in combination;
   a laser for generating a succession of laser pulses for application to said transmission line;
   a photodetector for measuring the intensity of light reflected from said transmission line as successive ones of said laser pulses propagate along said transmission line;
   a coupler for coupling said laser and said photodetector to said transmission line;
   randomizing means for controllably randomizing the phase positions of successive ones of said laser pulses; and
   averaging means for averaging the intensities of the light measured by said photodetector during the propagation of a plurality of said laser pulses;
   whereby the coherence noise observed by said reflectometer is reduced.

18. A reflectometer as set forth in claim 17 in which said randomizing means comprises a phase modulator.

19. A reflectometer as set forth in claim 18 in which said phase modulator is controlled by an electrical signal that varies as a function of time.

20. A reflectometer as set forth in claim 19 in which said electrical signal has a magnitude that changes between successive ones of said laser pulses.

21. A reflectometer as set forth in claim 17 in which said phase positions are varied over a range of phase positions that is wide enough to reduce said observed coherence noise.

22. A method for reducing the coherence noise observed by an optical time domain reflectometer of the type including a laser for generating pulses of laser light for application to an optical transmission line, and an optical path through which said pulses may propagate from said laser to said transmission line, comprising steps of:
   (a) providing a phase shifting device for shifting the phases of pulses of laser light passing therethrough;
   (b) connecting said phase shifting device to said optical path;
   (c) varying the phase shift produced by said phase shifting device to randomize the spectra of pulses applied to said transmission line;
   (d) measuring the intensity of light reflected back to said reflectometer as each of a plurality of said pulses propagates along said transmission line: and
   (e) averaging the intensities of the light measured during the propagation of each of a plurality of different ones of said pulses along said transmission line.

23. The method of claim 22 in which said varying step comprises the step of varying said phase shifts as a function of time.

24. The method of claim 22 in which said phase shifting device is an electrically controlled phase modulating assembly, and in which said connecting step comprises the step of connecting said modulating assembly in series with said optical path.

25. The method of claim 23 in which the varying of said phase shifts occur between successive ones of said pulses of laser light.

26. The method of claim 22 in which said phase shifts are varied over a range of phase shift that reduces said observed coherence noise.

27. A method for reducing the coherence noise observed by an optical time domain reflectometer of the type including a laser for generating optical pulses for application to an optical transmission line, and an optical path through which said pulses may propagate from said laser to said transmission line, comprising the steps of:
   (a) providing an apparatus for controllably advancing and retarding the phases of optical pulses passing therethrough;
   (b) coupling said apparatus to said optical path;
   (c) introducing time dependent variations in said advancing and retarding to alter the relative phases of optical pulses applied to said transmission line;
   (d) measuring the light reflected from said transmission line as each of a plurality of said optical pulses propagate through said transmission line; and
   (e) averaging the light measured during the propagation of a plurality of said optical pulses.

28. The method of claim 27 in which said providing step comprises the step of providing a controllable phase modulator, and in which said introducing step comprises the step of applying to said phase modulator a control signal that varies with time.

29. The method of claim 27 in which said providing step comprises the step of providing a phase modulator responsive to an electrical control signal.

30. The method of claim 27 in which said time dependent variations occur between successive ones of said optical pulses.

31. The method of claim 27 in which said advancing and retarding extends over a range that is wide enough to reduce said observed coherence noise.

* * * * *